United States Patent

[11] 3,584,787

| [72] | Inventor | J. W. Thomason |
| | | Route #1, Box 278, Gallion, Ala. 36742 |
| [21] | Appl. No. | 751,792 |
| [22] | Filed | Aug. 12, 1968 |
| [45] | Patented | June 15, 1971 |

[54] SPRAY MECHANISM
6 Claims, 6 Drawing Figs.

[52] U.S. Cl.................................................. 239/121,
47/1.7, 118/326, 222/176, 239/164, 239/172
[51] Int. Cl................................................ B05b 1/20
[50] Field of Search............................................ 239/104,
120, 121, 172, 164; 47/1.7; 137/NS; 118/326, 305;
141/NS; 244/NS; 222/176

[56] References Cited
UNITED STATES PATENTS

| 1,669,435 | 5/1928 | Wheeler.......................... | 47/1.7 |
| 2,111,030 | 3/1938 | Mote.............................. | 47/1.7 X |
| 2,293,517 | 8/1942 | Messinger et al............... | 47/1.7 UX |
| 3,147,568 | 9/1964 | Inhofer........................... | 47/1.7 |
| 3,257,989 | 6/1966 | Webb.............................. | 239/104 X |

*Primary Examiner*—Lloyd L. King
*Assistant Examiner*—Michael Y. Mar
*Attorneys*—Emory L. Groff and Emory L. Groff, Jr.

ABSTRACT: An open framework is pivotally supported on a tractor or the like, and power operated means is connected therewith for adjusting the position of the framework. A supply tank is connected with a plurality of nozzles adjustably mounted on the framework. The framework defines a plurality of plant gathering spaces, said spray nozzles being adapted to spray plants disposed within such gathering spaces. A plurality of spray receiving means are mounted on the framework and positioned to receive spray from the various spray nozzles. These spray receiving means are connected with storage tank means supported by the framework.

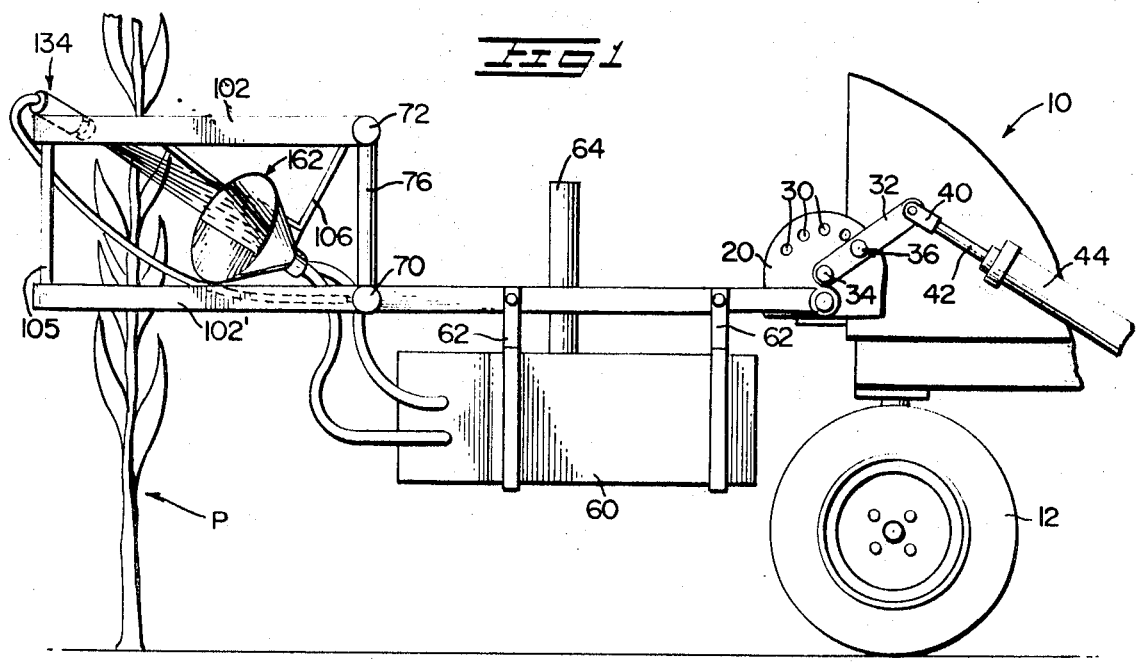
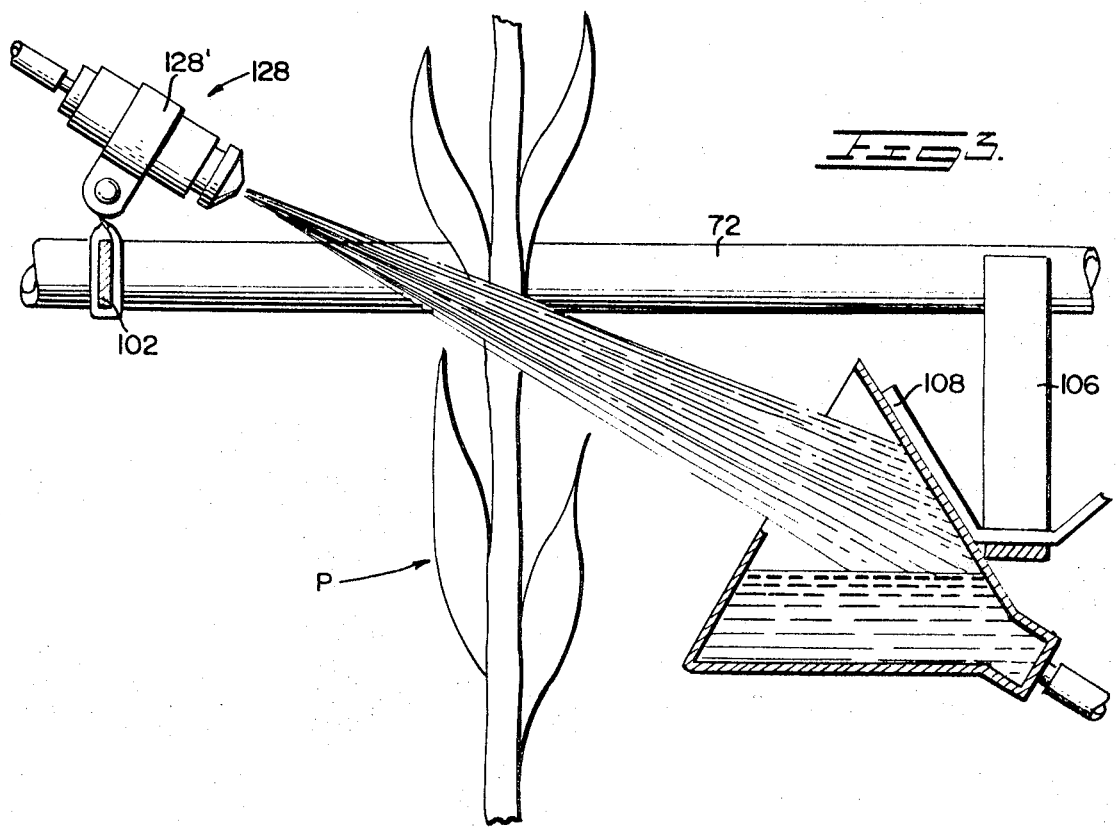

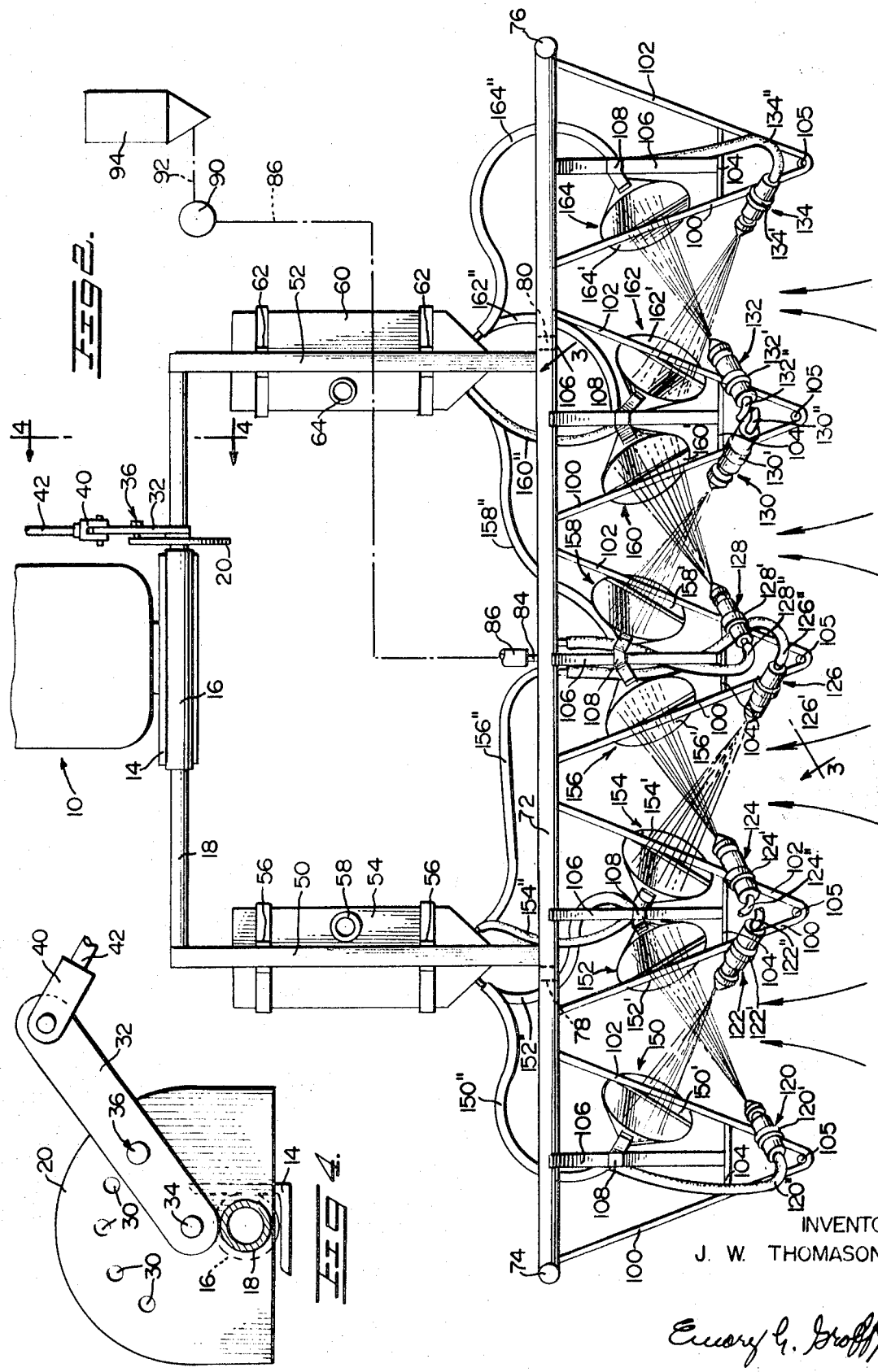

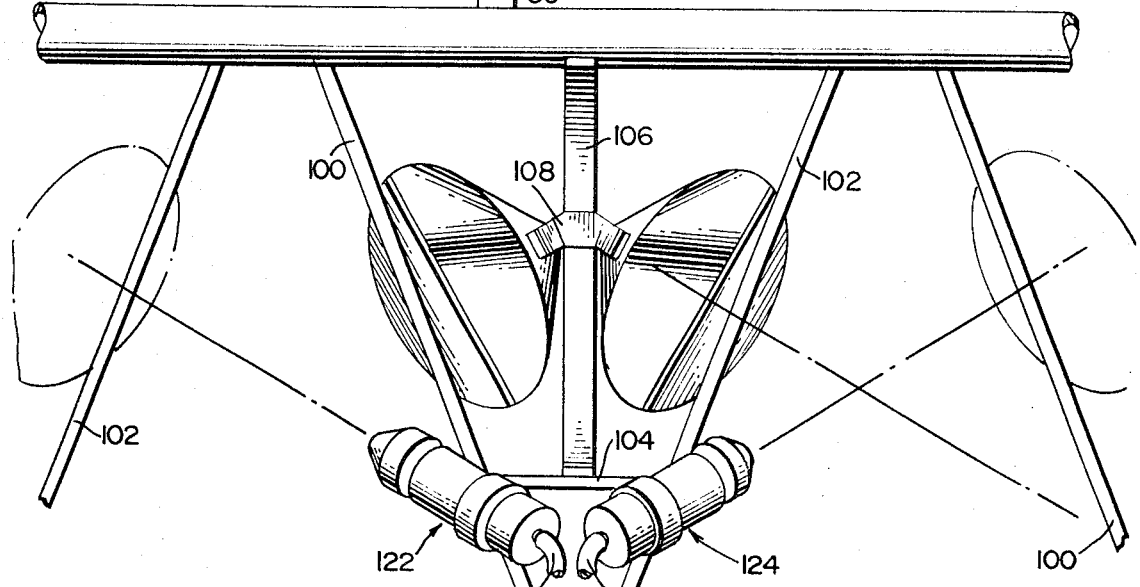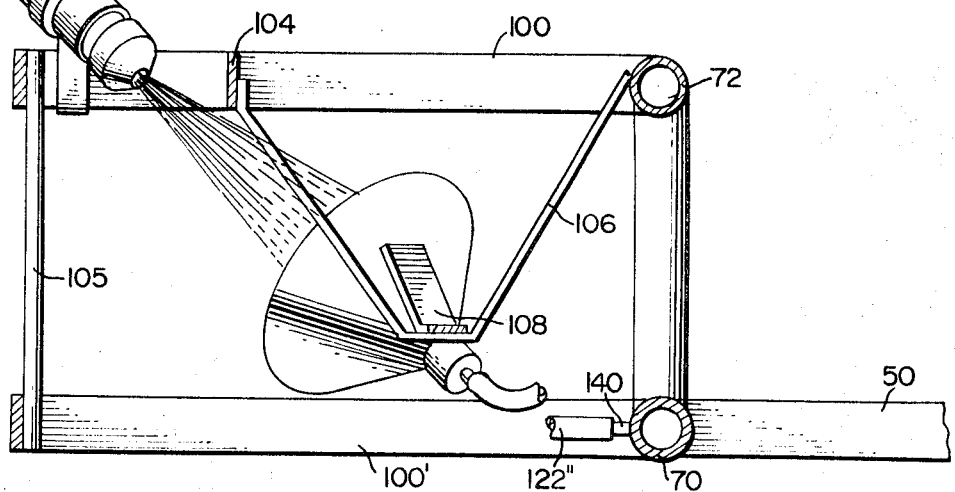

3,584,787

SPRAY MECHANISM

BACKGROUND OF THE INVENTION

The invention relates to spray mechanism adapted to be mounted on a tractor or the like for spraying undesired plants such as weeds, grasses, etc., occurring around crops in cultivated fields.

The spray mechanism of the present invention is adapted to be mounted on any suitable vehicle, and it is adapted to spray chemicals which may be deadly to the crop as well as the undesired plants such as weeds, grasses and the like.

Various spray mechanisms have been employed in the prior art for the purpose of the present invention, and such constructions have presented a number of disadvantages. Conventional arrangements for spraying plants are mounted in a substantially fixed horizontal plane and are not readily adjustable in a vertical direction. This type of arrangement is often impractical where it is desired to spray the plants with chemicals which are also deadly to the adjacent crops. If the spray mechanism is disposed at a level such that the chemical sprayed therefrom will also contact the crop, the mechanism is unsuitable for use.

An additional consideration is the fact that at different times of the year, the plant growth is at a substantially different vertical height. Accordingly, spray mechanisms which are not readily adjustable in a vertical direction are not suitable for use for spraying plant growth at different times of the year.

A further disadvantage of known arrangements of this type is the fact that a considerable amount of the sprayed liquid does not contact the plants and no means is provided for recovering same so that the amount of sprayed chemical consumed during operation of the apparatus is excessive. This type of operation is quite uneconomical when relatively expensive chemicals are employed.

SUMMARY OF THE INVENTION

In the present invention, a framework is provided defining plant gathering spaces. Spray means is supported by the framework for spraying plants disposed within the plant gathering spaces, and spray receiving means is also supported by the framework so as to receive spray which does not contact the plants.

Additionally, the framework is pivotally mounted so that the vertical height thereof can be adjusted, and means is operatively connected with the framework for moving it to a desired vertical height.

Accordingly, the level of the spray mechanism can be selectively adjusted so as to spray only undesired plant growth which has grown up above adjacent crops. Additionally, the spray mechanism of the present invention can be readily used all year around since the height of the mechanism can be adjusted in accordance with the degree of plant growth at the particular time of the year when the spraying operation is carried out.

The spray receiving means of the present invention serves to collect that portion of the spray which does not impinge upon plants, and accordingly virtually no sprayed chemical is wasted. The spray receiving means serves to collect the excess liquid spray whereupon the liquid is conducted to a storage tank for reuse at a later time. This results in great economy of operation when relatively expensive chemicals are utilized.

BRIEF DESCRIPTION OF THE DRAWINGS

FIG. 1 is a side view of the spray mechanism of the present invention illustrated as mounted at the forward end of a tractor or the like, the end spray receiving means being removed for the sake of illustration;

FIG. 2 is a top view of the structure shown in FIG. 1, illustrating certain components of the spray mechanism in schematic form;

FIG. 3 is a sectional view on an enlarged scale taken substantially along line 3–3 of FIG. 2 looking in the direction of the arrows;

FIG. 4 is a sectional view on an enlarged scale taken substantially along line 4–4 of FIG. 2 looking in the direction of the arrows;

FIG. 5 is an enlarged view of a portion of the structure shown in FIG. 2; and

FIG. 6 is a sectional view taken substantially along line 6–6 of FIG. 5 looking in the direction of the arrows.

DESCRIPTION OF THE PREFERRED EMBODIMENT

Referring now to the drawings wherein like reference characters designate corresponding parts throughout the several views, a tractor or like vehicle is indicated generally be reference numeral 10 and includes the usual front wheel assembly 12. A support means is provided in the form of an angle iron 14 suitable rigidly secured to the forward end of the tractor. A cylindrical support portion 16 is in turn rigidly secured to angle member 14 and serves to rotatably journal an elongated tubular member 18 comprising a portion of the framework of the spray mechanism.

A plate 20 is rigidly affixed to member 18 and has a plurality of spaced holes 30 formed therethrough. A connecting arm 32 is pivotally interconnected with plate 20 by pivot pin 34, and an intermediate portion of connecting arm 32 is adapted to be adjustably interconnected with plate 20 by a pin 36 extending through a hole formed in arm 32 and one of the holes 30 formed in the plate. This adjustable interconnection of arm 32 and plate 20 enables the power operated means hereinafter described to control the position of the associated framework through a relatively large degree of movement.

The opposite end of arm 32 is pivotally interconnected with a fitting 40 which is attached to the outer end of the piston rod 42 of a hydraulic ram mechanism including a cylinder 44. It is apparent that by selectively operating the hydraulic ram mechanism, the frame can be pivoted about the axis of members 16 and 18 to adjust the vertical height of the framework.

As seen most clearly in FIG. 2, a pair of longitudinally extending frame members 50 and 52 are rigidly connected to the opposite ends of member 18 and extend substantially parallel with one another. The various frame members are of suitable rigid metallic construction and may comprise galvanized iron or the like. A first storage tank 54 is suspended from frame member 50 by hanger members 56, and a vent 58 open at the upper end extends vertically upwardly from the tank. A similar tank 60 is suspended from frame member 52 by hangers 62, and a vertically extending vent 64 is open at the upper end thereof.

As seen in FIG. 1, the framework includes a pair of transversely extending tubular members 70 and 72, these members being parallel with one another. As seen in FIG. 2, member 70 is rigidly secured to the forward ends of the frame members 50 and 52, and tubular member 72 is maintained in spaced relationship to tubular member 70 by tubular end members 74 and 76 having the opposite ends thereof rigidly affixed to members 70 and 72 respectively. A pair of intermediate members 78 and 80 have the opposite ends thereof rigidly secured to members 70 and 72, whereby a strong structure is provided.

A fitting 84 interconnected with a central portion of the lower tubular member 70 is in turn connected by means of a flexible conduit means 86 such as rubber hose with a pump 90 suitable mounted at a remote position on a tractor. This pump 90 is in turn connected through a conduit means 92 with a supply tank 94 having a liquid disposed therein containing a suitable chemical for spraying on plants. The pump may for example be a rotary pump delivering a constant flow of liquid to the spray nozzles hereinafter described at a pressure of approximately 20 pounds.

The fitting 84 as mentioned previously is connected with an intermediate portion of the tubular part 70 of the framework, and accordingly member 70 which is closed at the opposite ends comprises a manifold which is operatively connected with the various spray nozzles hereinafter described.

The framework defines a plurality of plant gathering spaces. These plant gathering spaces as seen most clearly in FIG. 2 are defined by a plurality of parts which as seen in plan view define five spaced generally triangular structures each of which includes a pair of portions 100 and 102 rigidly secured to the upper tubular member 72 and extending forwardly thereof. These portions 100 and 102 are interconnected by reinforcing crossmember 104 spaced from the forward end thereof, and a vertically extending member 105 is connected with the apex portion of each of these triangular structures. The vertically extending portion 105 of each of the triangular structures extends downwardly to a similar triangular structure disposed immediately beneath the upper triangular structure as seen in FIG. 2 and secured to the lower tubular member 70.

The arrows as shown in FIG. 2 indicate the manner in which plants are guided into the four plant gathering portions defined by tapering portions 100 and 102 of adjacent triangular structures. It is apparent that these tapering members will guide plants into the tapered plant gathering spaces as seen in FIG. 2 when the spray mechanism is moved in the direction of driving movement of the tractor. A strap 106 has the opposite ends thereof connected between the crossmember 104 of each of the aforementioned triangular structures and tubular member 72. As seen most clearly in FIG. 6, each of these strap members is of generally U-shaped configuration. A support bracket 108 is connected with the lowermost portion of each of the straps and extends laterally thereof for supporting the spray receiving means hereinafter described.

As seen most clearly in FIG. 2, a plurality of spray nozzles 120, 122, 124, 126, 128, 130, 132 and 134 are provided, the spray nozzles being eight in number and suitably secured to members 100 and 102 so that a pair of spray nozzles are disposed at opposite sides of each of the plant gathering spaces and are directed inwardly and downwardly toward the plants disposed within said spaces.

The spray nozzles are adjustably supported in the position as illustrated by suitable clamp members, each clamp member being given the same reference numeral primed as the associated spray nozzle. One of these clamp members 128' is illustrated in detail in FIG. 3 and enables the spray nozzle to be adjustably mounted so as to properly direct spray therefrom toward the plants disposed in the associated plant gathering space.

Each of the spray nozzles has a suitable conduit means in the form of a rubber hose or the like associated therewith, each of these conduit means being given the same reference numeral double primed as the associated spray nozzle. Each of these flexible hoses is in turn connected with a suitable fitting connected with the manifold 70 previously described. As seen in FIG. 6, the hose 122" is connected with a fitting 140, this construction being typical of the connections of each of the flexible hoses associated with the various spray nozzles.

The spray nozzles may be of relatively conventional construction, and in a typical example may comprise bronze nozzles having small round holes formed therein for producing a fine spray when liquid is ejected therethrough.

A plurality of spray receiving means are supported by the support brackets 108 previously described, the spray receiving means 150, 152, 154, 156, 158, 160, 162 and 164 being supported on the framework in such a position as to receive spray from nozzles 122, 120, 126, 124, 130, 128, 134, and 132 respectively. Each of these spray receiving means comprises a substantially funnel-shaped metallic member.

A baffle or flange is formed at the lower part of each of the funnel-shaped spray receiving members for preventing liquid spray received by the spray receiving means from overflowing, these baffles or flanges being given the same reference numeral primed as the associated spray receiving means.

Each of the spray receiving means is in turn connected by suitable conduit means such as a flexible rubber hose with one of the storage tanks 54 and 60 previously described. The rubber hose connected with each of the spray receiving means has been given the same reference numeral double primed as the associated spray receiving means. It will be noted as seen in FIG. 2 that the spray receiving means 150, 152, 154 and 156 are connected with tank 54 while the remaining spray receiving means 158, 160, 162 and 164 are connected with storage tank 60.

The hydraulic ram means permits ready vertical adjustment of the framework so that it can be properly oriented to receive a plant indicated by reference character P in the drawings within one of the converging plant receiving spaces defined by the framework. The pump will force liquid to the various spray nozzles from which a spray is directed toward plants disposed within the plant gathering spaces. Any portion of the liquid spray which does not impinge upon the plants will then be received within one of the spray receiving means and conducted to one of the storage tanks. The liquid can then be subsequently returned to the supply tank 94 by placing a flexible hose within one of the vent openings 58 or 64 of one of the storage tanks and connecting such hose with the suction connection of pump 90.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as cojointly cooperative equivalents are therefore intended to be embraced by those claims.

What I claim is:

1. Spray mechanism comprising a framework, said framework defining plant gathering spaces, spray means supported by said framework for discharging a spray on plants within said plant gathering spaces, said spray means including a plurality of nozzles supported on said framework in spaced relationship to one another, spray receiving means supported nd positioned to receive spray from said spray means, said spray receiving means comprising a plurality of hollow means each of which is positioned to receive spray from one of said spray nozzles, said plants gathering spaces defined by parts of said framework which taper toward one another from front to rear of said framework.

2. Apparatus as defined in claim 1, including support means, said framework being pivotally supported by said support means.

3. Apparatus as defined in claim 1, including power operated means operatively connected with said framework for moving said framework.

4. Apparatus as defined in claim 1 including a supply tank for holding a supply of liquid to be discharged from said spray means, and pump means operatively associated with said supply tank and said spray means for feeding liquid from said tank to said spray means.

5. Apparatus as defined in claim 1 wherein each of said spray receiving means includes a baffle for preventing liquid received from said spray nozzles from overflowing.

6. Apparatus as defined in claim 1, including storage tank means supported by said framework, and conduit means interconnecting said spray receiving means with said storage tank.